March 1, 1966     W. L. KEIFER     3,237,551
APPARATUS FOR BLANCHING FOOD PRODUCTS
Original Filed Sept. 17, 1959
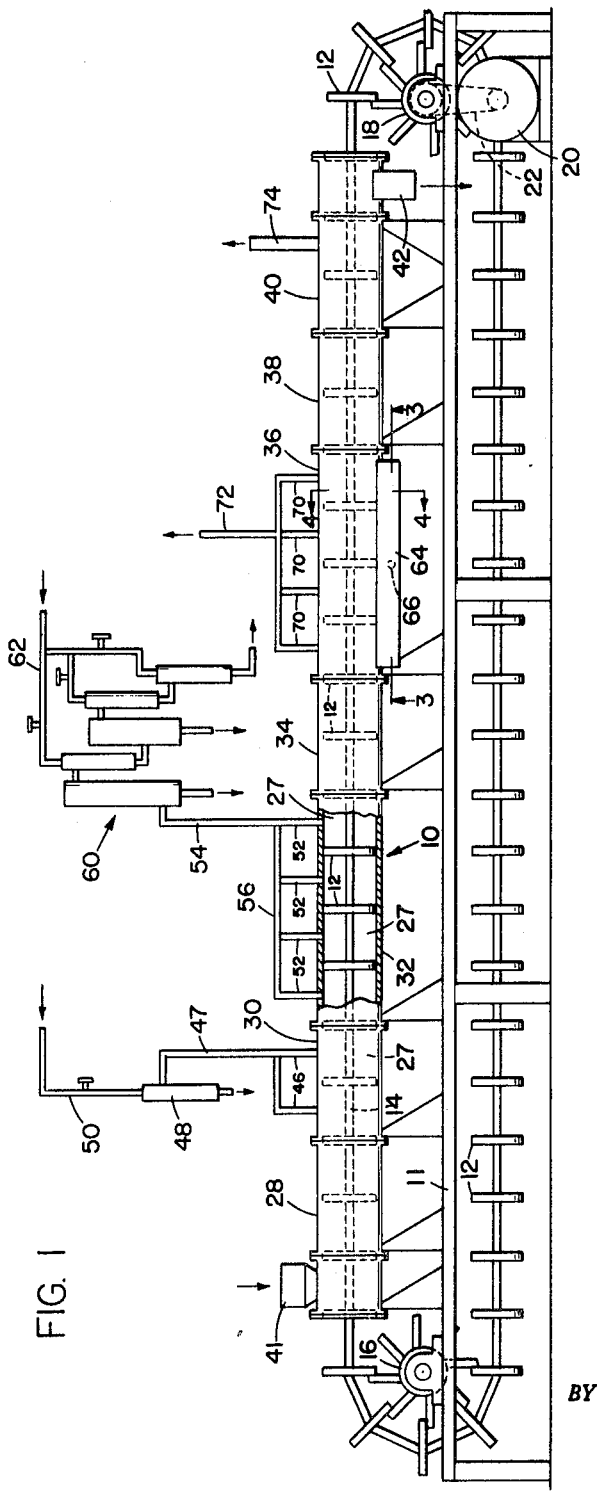
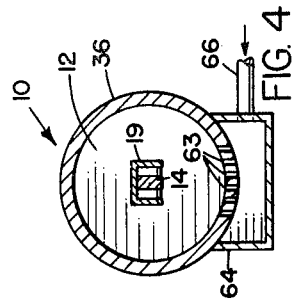
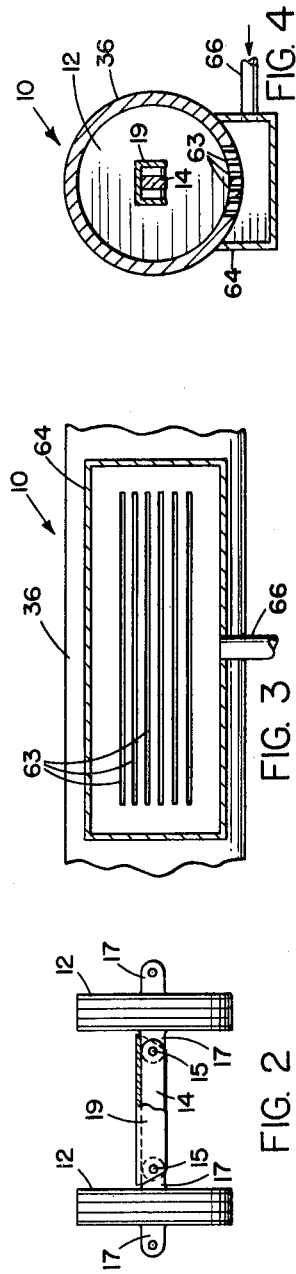
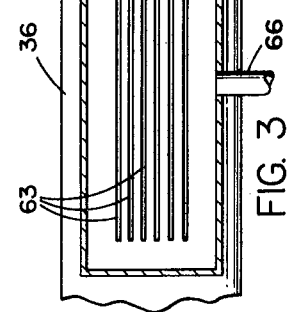
*INVENTOR.*
WILLIAM L. KEIFER
BY
*Attorney*

United States Patent Office 3,237,551
Patented Mar. 1, 1966

3,237,551
APPARATUS FOR BLANCHING FOOD PRODUCTS
William L. Keifer, Lyons, N.Y., assignor to The Borden Company, New York, N.Y., a corporation of New Jersey
Original application Sept. 17, 1959, Ser. No. 840,763, now Patent No. 3,086,868, dated Apr. 23, 1963. Divided and this application Sept. 4, 1962, Ser. No. 220,981
1 Claim. (Cl. 99—239)

The present invention relates to apparatus for blanching produce, and more particularly to apparatus for blanching apples. This application is a division of my copending United States application Serial No. 840,763, filed September 17, 1959, now Patent No. 3,086,868, granted April 23 1963, which covers the process of this invention. The present application is restricted to claims to apparatus employed in practicing the invention.

The preparation of many food products requires the inactivation of the enzymes by a process commonly known as blanching.

Heretofore, various methods have been employed for blanching fruit, such as apples. One method was to dump a large batch of sliced apples into a mild salt water solution having a temperature of 150° F., to soak the apples in this solution for approximately forty-five minutes to remove the oxygen from the slices so that the tin plate of the can would not be attacked, and then to blanch the apples for two or three minutes in hot water having a temperature of approximately 190° F. The apples were then canned.

An improvement over this batch method involved placing a large quantity of the sliced apples in a container, filling the container with water until the apples were submerged, and then sealing the container and creating a vacuum therein to remove the air from the apples. The apples were thereafter blanched, as previously described, at atmospheric pressure.

Both the above methods have largely been supplanted by a process in which a large batch of sliced apples is placed in a vessel larger than those used in the previously described methods, sealing the large vessel and evacuating the apple slices while dry, that is without submerging them in any liquid. The evacuated apple slices are then submerged under a liquid containing a solution of apple juice and salt. The fruit picks up the liquid to an extent approximately ten percent of its weight. The apple slices are then drained and dumped into a hot water blancher as previously described.

None of these methods have been found to be completely satisfactory. It is difficult to distribute the heat evenly throughout the product; the degree of blanching varies between separate batches; and the process entails considerable handling.

Because of these objections attempts have been made to blanch fruit, such as apples, by a continuous process. However, the apparatus heretofore proposed for such a process has been unsatisfactory in operation with the result that heretofore no continuous blanching process for apples has come into practical commercial use.

One of the objects of the present invention is to provide improved apparatus for blanching fruit, such as sliced apples.

Another object of the invention is to provide improved apparatus for blanching fruit which will reduce the handling to a minimum.

A more specific object of the invention is to provide apparatus for successively pre-treating and blanching sliced apples in a continuous operation.

Another object of the invention is to provide improved apparatus of the character described which will permit the subjecting of the fruit to a higher degree of vacuum, minimizing possibility of deterioration of the can.

Another object of the invention is to provide an apparatus for blanching sliced apples which will increase the yield.

A further object of this invention is to provide an improved apparatus for blanching fruit, such as apples, under pressure which reduces leaching of the sugar solids, thereby resulting in a fruit of improved quality.

A still further object of this invention is to provide an improved apparatus for blanching fruit such as apples whereby syrup may be effectively introduced into the fruit during the blanching operation.

Still another object of the invention is to provide an apparatus for blanching fruits, such as sliced apples, which will result in a faster penetration and a more complete exposure of the apples to the blanching medium.

A still further object of this invention is to provide an improved apparatus of the character described which causes the blanching steam to rapidly and effectively penetrate the fruit with a minimum of abrasive action and maximum distribution.

A still further object of this invention is to provide an apparatus for blanching fruits, such as sliced apples, which will result in a uniformly blanched product which does not vary from batch to batch.

Further objects of the invention are to provide an apparatus of the type described which will insure better texture, and better color in the finished blanched product.

Other objects of this invention will be apparent from the specification and from the recital of the appended claims, particularly when read in conjunction with the accompanying drawing.

In the drawing:

FIG. 1 is a side elevation of apparatus constructed according to one embodiment of the invention;

FIG. 2 is an elevation on an enlarged scale of one of the pistons and a link of the connecting chain used in this embodiment of the invention;

FIG. 3 is a fragmentary sectional view on a somewhat enlarged scale taken on line 3—3 of FIG. 1 looking in the direction of the arrows; and FIG. 4 is a fragmentary sectional view, also on a somewhat enlarged scale, taken on line 4—4 of FIG. 1, looking in the direction of the arrows.

Referring now to the drawing by numerals of reference, the illustrated embodiment of the invention comprises an elongate tube denoted at 10, which is supported by a base 11 in a substantially horizontal position. A plurality of pistons 12, which form part of an endless chain conveyor, are designed to travel through this tube. The pistons 12 are spaced from one another and are connected together by links 14. The ends of the links 14 are pivotally connected by pins 15 to ears 17 attached to or integral with the pistons. A U-shaped hood or cover 19 (FIGS. 2 and 4) covers each link 14, being also pivotally attached to adjoining pistons 12 by pins 15.

The endless chain is arranged to travel over sprockets 16 and 18. The sprocket 18 is driven by a motor 20 through a chain 22. The spaced pistons 12 are of a size to sealingly engage the inner wall of the tube 10 as they move through the tube, as shown in section in FIG. 1, thereby to form a series of closed chambers 27 which hold the produce to be blanched.

The tube 10 is of sufficient length to carry out the complete blanching process as the produce is carried through the tube in the individual chambers 27, formed between adjacent pistons 12. In actual practice, a tube approximately thirty-five feet in length and twelve inches in diameter has been successfully used. The tube 10 is divided into a series of sections. These sections comprise a sealing section 28, an intermediate vacuum section 30, a high vacuum section 32, a sealing section 34, a steam section 36, a sealing section 38, and a venting section 40. The produce is dumped into each individual chamber 27 through a hopper 41 at an end of the tube and is discharged through a chute 42 at the other end of the tube.

The intermediate vacuum section 30 is in communication with pipes 46 that are connected to a pipe 47 which is connected to an air ejector 48 for evacuating air from the chambers 27 when they are traveling in the section 30. The air ejector is actuated by the introduction of steam through a pipe 50 and is capable of pumping down the chamber 27 in the section 30 to an intermediate vacuum.

Forward of the vacuum section 30 is a high vacuum section 32 which is in communication with a manifold comprising a plurality of spaced branch pipes 52 and a common connecting pipe 56. Pipe 56 is connected to a pipe 54 which, in turn, is connected to a three stage air ejector, indicated at 60, which is actuated by steam from a pipe 62. The vacuum in the section 32 is increased to approximately twenty-nine inches of mercury.

The steam section 36 of the tube has a plurality of narrow slots 63 which extend along the bottom quadrant of the tube parallel to the direction of movement of the chain through this section. A manifold 64 covers these narrow slots in the steam section 36; and steam is introduced into the side of the manifold through a pipe 66. The steam is exhausted at the top portion of the tube through a manifold comprising a plurality of exhaust outlets 70, which are connected to a common exhaust pipe 72. The introduction of steam through the slots 63 at the bottom quadrant of the tube cases the produce in the individual chambers 27 to float on the steam thus permitting a quicker and more thorough exposure of the produce to the steam than was heretofore known. The steam pressure may be regulated by a valve (not shown) in the steam admission pipe 66 or in the exhaust pipe 72.

The section 40 of the tube has a vent 74 which serves to exhaust any remaining steam in the individual chambers prior to discharge of the produce through the chute 42.

The sealing sections 28, 34 and 38 are provided in the tube to seal off adjacent chambers 27 from any pressure differentials which may exist during the blanching process. For example, the sealing chamber 28 acts as a buffer section between sections 30 and hopper 41 to prevent the vacuum created in the chamber 30 from being destroyed because of leakage around the periphery of a piston 12. The sealing section 34 acts as a buffer section between sections 32 and 36 to prevent the destruction of the vacuum created in the section 32 by the leaking of steam around the periphery of a piston 12. The sealing section 38 acts as a buffer section between sections 36 and 40 to prevent the escape of steam from the section 36 around the periphery of a piston 12, into the section 40.

Prior to introducing the produce into the chambers 27 through the hopper 41, the air ejectors 48 and 60 are turned on. A source of steam at approximately twelve pounds per square inch, for example, is admitted through the pipe 66. The variable drive 22 is adjusted so that the pistons 12 will travel at the desired rate of speed which may be between twenty feet and sixty feet per minute, depending upon the maturity and type of produce to be blanched.

The apparatus described herein is employed in the blanching of the fruit as follows:

Produce, such as apples, for example, are first washed and then sliced or otherwise cut up into small pieces to provide for better penetration to the center of the fruit. A predetermined quantity of the sliced apples is introduced into each chamber 27 through the hopper 41 as the chambers move through the tube. This quantity may vary but preferably not more than one-half of each chamber 27 should be filled. These small batches of apples permit more complete exposure and faster penetration of the apples in the blanching process. The pistons carry the apples through the sealing section 28, into the vacuum section 30 where the chambers 27 are pumped down by means of the air ejector 48. The purpose is to remove air entrained in the apple slices. If oxygen remained in the slices it would attack the cans in which the fruit is subsequently to be packed. As previously mentioned air is prevented from being drawn into the section 30 by the sealing section 28. The apples are carried from section 30 into the high vacuum section 32, which rapidly evacuates the air from the produce, by means of the air ejectors 60. This rapid evacuation to a high degree of vacuum probably causes the cells of the fruit to rupture, and the air channels out by rapid exhaustion. This section 32 is of sufficient length so that four chambers 27 are simultaneously under high vacuum; and each chamber is subjected to this vacuum anywhere from ten to thirty seconds depending on the speed of travel of the chain. The chambers then pass through the sealing section 34 which prevents steam from leaking into the high vacuum section. This leakage would permit a bleed down into the vacuum section, which would prevent the rapid evacuation of the air, and the retention of the vacuum for the proper length of time. The apples then enter the steam section 36 where steam under pressure enters through the slits 63 into the chambers 27. The steam flows from beneath the fruit so that the latter actually rides on a blanket of steam. The steam entering the manifold and the slits causes maximum distribution of steam with a minimum of abrasive action. This exposure continues during the length of time that it takes for a chamber 27 to travel through the entire length of the steam section 36.

This rapid exposure of the apples to steam under pressure in a relatively small mass following the rapid evacuation of air to a high degree of vacuum, cause the individual pieces of the apples to be actually cooked from the center out, rather than being cooked on the outside first. Thus, sluffiness on the exterior of the fruit, which makes the product of inferior quality, is avoided. Moreover, the method of the present invention causes the product to absorb water in its cells which increases the yield.

Sugar syrup may be added in the steam section 36 by either atomizing it with the steam, or introducing it through separate injectors. Syrup introduced in this manner reduces the leaching of the sugar solids, and gives constant sugar content.

The apples then move into the sealing section 38 of the tube, which is provided to prevent steam from exhausting into the section 40, which would reduce the required pressure in the section 36 and prevent the proper blanching of the produce in accordance with the proper time temperature relationship. When the produce passes through the section 40, the steam in the chambers exhausts through the vent 74. The completely blanched produce is then discharged through the chute 42, and is now ready for canning or freezing.

It is apparent that since the movement of the chambers is continuous and progressive, that the degree of blanching will be uniform and not vary from batch to batch. Moreover, with the apparatus and method employed herein the leakage of air and steam into the evacuated chambers, and the leakage of steam from the pressure chambers is effectively prevented.

Thus, I have provided an improved method and apparatus which efficiently blanches the produce and with which the length of time required for blanching is substantially reduced, and which results in a superior product that is of better color, better texture, and in an increased yield.

While the invention has been described in connection with a specific embodiment thereof, it will be understood that it is capable of further modification, and this application is intended to cover any variations, uses, or adaptations of the inveniton following, in general, the principles of the invention and including such departures from the present disclosure as come within known or customary practice in the art to which the invention pertains and

Having thus described my invention, what I claim is:

Apparatus for blanching produce, comprising
- (a) a tube,
- (b) a plurality of axially spaced members mounted in said tube and sealingly engaging the inner peripheral surface thereof thereby to form a plurality of sealed chambers in said tube in the axial spaces between said members,
- (c) said tube having openings therein adjacent opposite ends thereof, respectively, for supplying produce to said chambers, and for discharging produce from said chambers, respectively,
- (d) drive means for moving said members and tube axially relative to one another thereby to cause said chambers and any produce therein to advance from the supply opening to the discharge opening in said tube,
- (e) vacuum means communicating with the interior of said tube for a first predetermined length thereof between said supply and discharge openings, and operative to evacuate air from each of said chambers during the movement thereof toward said discharge opening,
- (f) and further means communicating with the interior of said tube through the underside thereof for a second predetermined length thereof between said first predetermined length of said tube and said discharge opening, and operative to introduce steam into each chamber and beneath the produce therein during the movement thereof toward said discharge opening and subsequent to the evacuation of air therefrom, said vacuum means comprising
- (g) a first air ejector communicating with part of said first predetermined length of said tube between said supply opening and said second predetermined length, and operative to create a vacuum in said chambers as they pass said first air ejector, and
- (h) a second air ejector communicating with the remaining part of said first predetermined length and operative to further exhaust air from said chambers,
- (i) said first and second predetermined lengths of said tube being separated from one another by a section of said tube equal in length to at least the axial space between any two successive axially-spaced members in said tube, and
- (j) said supply and discharge openings, respectively, being also separated from said first and second predetermined lengths of tube, respectively, by a section of tube equal in length at least to the length of the axial space between any two said successive axially-spaced members.

References Cited by the Examiner

UNITED STATES PATENTS

| | | | |
|---|---|---|---|
| 1,545,596 | 7/1925 | Olney | 99—443 |
| 2,020,342 | 11/1935 | Thompson | 99—252 |
| 2,403,871 | 7/1946 | McBean | 99—103 |
| 2,528,476 | 10/1950 | Roos et al. | |
| 2,610,914 | 9/1952 | Cassidy et al. | |
| 2,638,419 | 5/1953 | Robichaux | 99—272 X |
| 3,006,269 | 10/1961 | Bardet al. | 99—443 X |

FOREIGN PATENTS 343,842   11/1921   Germany.

ROBERT E. PULFREY, *Primary Examiner.*

JEROME SCHNALL, *Examiner.*